(12) United States Patent
Subramoney et al.

(10) Patent No.: US 9,251,096 B2
(45) Date of Patent: Feb. 2, 2016

(54) DATA COMPRESSION IN PROCESSOR CACHES

(71) Applicant: Intel Corporation, Santa Clara, CA (US)

(72) Inventors: Sreenivas Subramoney, Bangalore (IN); Jayesh Gaur, Bangalore (IN); Alaa R Alameldeen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 301 days.

(21) Appl. No.: 14/036,673

(22) Filed: Sep. 25, 2013

(65) Prior Publication Data

US 2015/0089126 A1    Mar. 26, 2015

(51) Int. Cl.
*G06F 12/08* (2006.01)
*G06F 12/12* (2006.01)

(52) U.S. Cl.
CPC .......... *G06F 12/126* (2013.01); *G06F 12/0895* (2013.01)

(58) Field of Classification Search
None
See application file for complete search history.

(56) References Cited

U.S. PATENT DOCUMENTS 6,324,621 B2 * 11/2001 Singh ............................. 710/68
2001/0001872 A1 * 5/2001 Singh .................. G06F 12/0802
711/129

* cited by examiner

*Primary Examiner* — Kevin Verbrugge
(74) *Attorney, Agent, or Firm* — Trop, Pruner & Hu, P.C.

(57) ABSTRACT

In an embodiment, a processor includes a cache data array including a plurality of physical ways, each physical way to store a baseline way and a victim way; a cache tag array including a plurality of tag groups, each tag group associated with a particular physical way and including a first tag associated with the baseline way stored in the particular physical way, and a second tag associated with the victim way stored in the particular physical way; and cache control logic to: select a first baseline way based on a replacement policy, select a first victim way based on an available capacity of a first physical way including the first victim way, and move a first data element from the first baseline way to the first victim way. Other embodiments are described and claimed.

20 Claims, 12 Drawing Sheets

DATA COMPRESSION IN PROCESSOR CACHES

TECHNICAL FIELD

Embodiments relate generally to computer memory.

BACKGROUND

Conventionally, computing devices include a central processor and main memory (e.g., random-access memory external to the processor). The processor may read data and instructions from the main memory, and may write execution results to the main memory. Some processors may use cache memory to store copies of data blocks that are also stored in the main memory, and that may be required by the processor in the near future. Thus, in the event that the cached data blocks are required by the processor, these data blocks do not have to transferred from the main memory. In this manner, the cache memory may enable faster and/or more efficient execution by the processor.

DETAILED DESCRIPTION

In accordance with some embodiments, a physical cache may store compressed data elements (e.g., blocks, lines, etc.), and may be used to provide multiple logical cache levels. Specifically, in some embodiments, the physical cache may be used to provide a baseline cache and one or more victim caches. The baseline cache may provide all or some of the functionality of a conventional cache. Further, a victim cache may store data evicted from the baseline cache (or another victim cache). By providing additional caching functionality beyond that of a conventional cache, embodiments may reduce the number of main memory reads due to cache misses, and may thereby improve overall system performance.

Figure 1A:
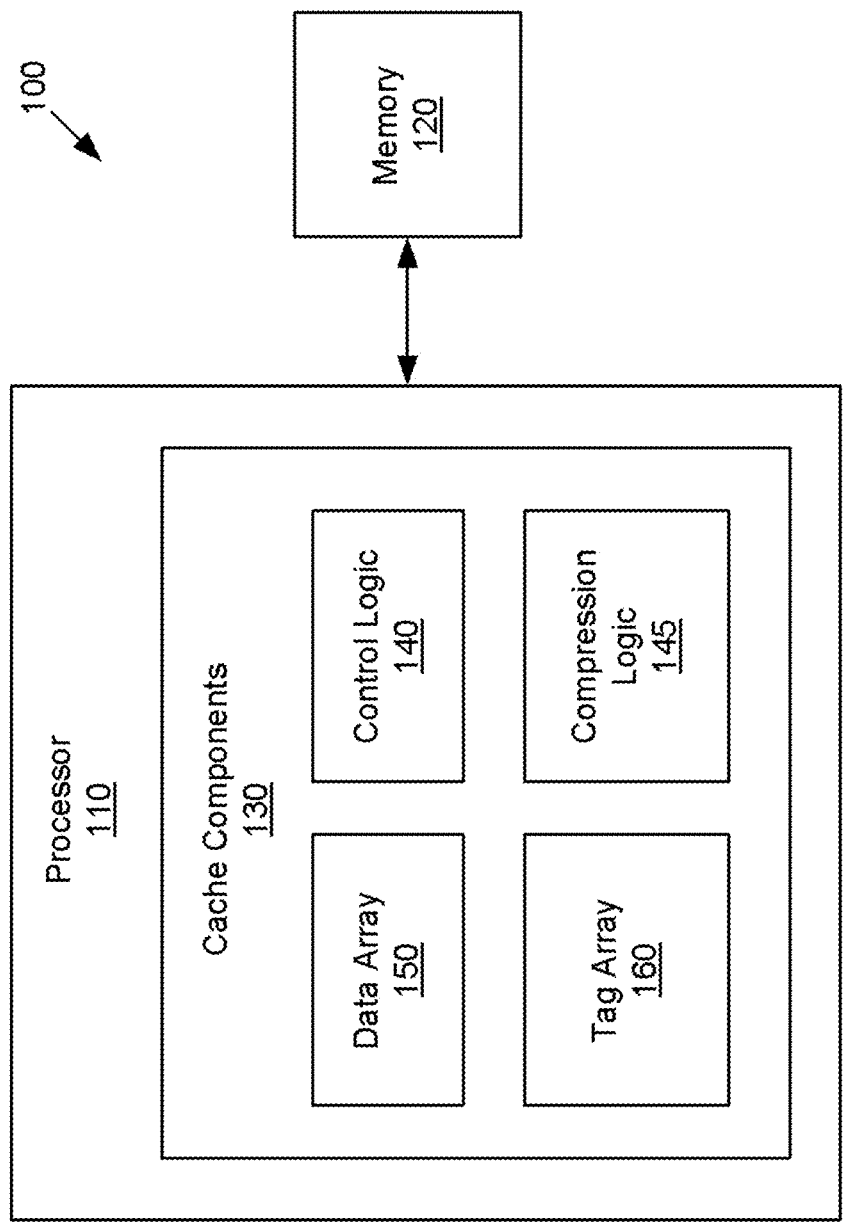
FIGS. 1A-1B are block diagrams in accordance with one or more embodiments.

Referring to FIG. 1A, shown is a block diagram of a system 100 in accordance with one or more embodiments. In some embodiments, the system 100 may be all or a portion of any electronic device, such as a cellular telephone, a computer, a server, a blade, a media player, a network device, an appliance, etc.

As shown in FIG. 1A, the system 100 may include a processor 110 coupled to a memory 120. The memory 120 may be any type of computer memory (e.g., dynamic random access memory (DRAM), static random-access memory (SRAM), etc.).

As shown, the processor 110 may include cache components 130. In one or more embodiments, the cache components 130 may include a data array 150, a tag array 160, control logic 140, and compression logic 145. In some embodiments, the cache components 130 may represent a single cache unit or level (or each of multiple cache units or levels) of the processor 110. For example, the cache components 130 may correspond to one or more of a first level cache, a mid-level cache (MLC), a last level cache (LLC), etc.

In some embodiments, the data array 150 may include any number of physical cache memory locations, which may be referred to as "physical ways." Such physical ways may each include a specified number of segments. In some embodiments, a segment may be the smallest data block that can be stored in the data array 150. For example, in some embodiments, each physical way may store 64 bytes, and may be composed of eight segments of eight bytes each.

In one or more embodiments, each physical way of the data array 150 may include functionality to store two or more logical ways. In some embodiments, within a physical way, each logical way may correspond to a different cache level. For example, each physical way may include a baseline way (corresponding to a first level) and a victim way (corresponding to a second level).

In one or more embodiments, each logical way in the data array 150 may be uniquely associated with a tag. Further, the tag array 160 may include multiple tags, with each tag corresponding to a different logical way. In some embodiments, the tag array 160 may be used to locate the logical way storing a particular data element. For example, a tag may include all or a portion of an identifier (e.g., a memory address) associated with the data element. The functionality of the logical ways and their associated tags is described further below with reference to FIGS. 2A-2C.

In one or more embodiments, the compression logic 145 may include functionality to compress and/or decompress the data stored in the data array 150. For example, in the event of a cache miss, the compression logic 145 may receive uncompressed data from the memory 120, and may compress the data before it is stored in the data array 150. Further, in the event of a cache hit, the compression logic 145 may decompress data stored in the data array 150 before it is provided to an execution unit.

In some embodiments, the compression logic 145 may provide a defined maximum compression ratio (e.g., two-to-one, three-to-one, four-to-one, etc.). Further, the compression logic 145 may use any number of compression algorithms or methods. For example, the compression logic 145 may use algorithms such as Huffman coding, arithmetic coding, run-length encoding, Lempel-Ziv, Burrows Wheeler, etc.

Figure 1B:
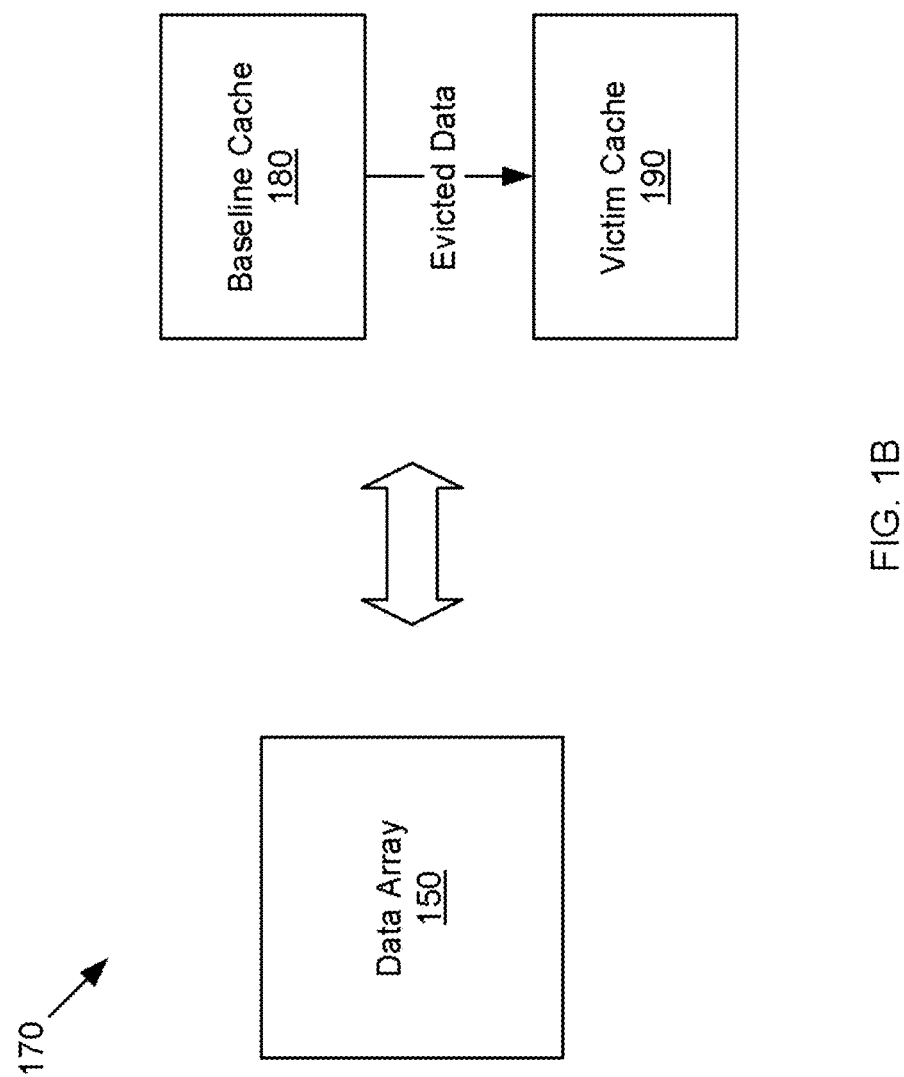

In one or more embodiments, the control logic 140 may include functionality to provide multiple logical cache units or levels. Referring now to FIG. 1B, shown is a diagram 170 illustrating this functionality of the control logic 140. As shown, in some embodiments, the control logic 140 may use the data array 150 to provide a baseline cache 180 and a victim cache 190.

In some embodiments, the baseline cache 180 may be a logical cache providing similar functionality to that which would be provided by the data array 150 if used as a conventional cache. For example, the baseline cache 180 may store compressed data, and may have the same capacity as that which would be provided by the data array 150 if storing uncompressed data. In another example, the baseline cache 180 may provide the same replacement functionality that would be provided by the data array 150 if used as a conventional cache. For example, the baseline cache 180 may use one or more conventional replacement policies (e.g., least recently used (LRU), random replacement, least frequently used, most recently used, pseudo-LRU, segmented LRU, etc.) to evict data elements.

In one or more embodiments, the victim cache 190 may be a logical cache to store data elements evicted from the baseline cache 180. In some embodiments, the victim cache 190 may store the evicted data elements in compressed form. Further, in the event that a requested data element is not included in the baseline cache 180 (i.e., a cache miss), the victim cache 190 may be used to attempt to provide the requested data element.

In some embodiments, the number of logical caches may depend on the compression ratio of the stored data. For example, assume that the diagram 170 shown in FIG. 1B corresponds to a maximum compression ratio of two-to-one. Thus, as shown in FIG. 1B, the data array 150 may be as two logical caches, namely the baseline cache 180 and the victim cache 190. In another example, assuming a compression ratio of three-to-one, the data array 150 may be as three logical caches, namely the baseline cache 180, the victim cache 190, and a secondary victim cache (not shown). In this example, the secondary victim cache may store data elements evicted from the victim cache 190, and may be used in the event of a cache miss in the victim cache 190. It is contemplated that, in such a manner, any number of victim caches may be provided.

Figure 2A:
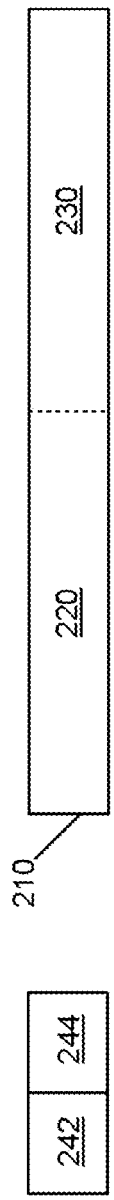
FIGS. 2A-2G are block diagrams in accordance with one or more embodiments.

Referring now to FIG. 2A, shown is an example of a physical way 210 in accordance with one or more embodiments. The physical way 210 may correspond generally to an example of one of multiple physical ways included in the data array 150 (shown in FIG. 1A).

As shown, in this example, the physical way 210 may include two logical ways, namely a baseline way 220 and a victim way 230. Further, the baseline way 220 may be associated with a first tag 242, and the victim way 230 may be associated with a second tag 244. In some embodiments, the first tag 242 and the second tag 244 may be included in the tag array 160 (shown in FIG. 1A). As described above, in some embodiments, the tag array 160 may be used to locate a logical way storing a particular data element. Accordingly, in the example of FIG. 2A, the first tag 242 may be used to determine if a particular data element is stored in the baseline way 220. Similarly, the second tag 244 may be used to determine if a particular data element is stored in the victim way 230.

In some embodiments, the sizes (i.e., storage capacities) of the logical ways may be dynamically configurable to fill the capacity of the physical way 210. For instance, assume that, in the example of FIG. 2A, the physical way 210 includes eight segments (not shown). Thus, in this example, the respective sizes of the baseline way 220 and the victim way 230 may be any combination that totals eight segments (e.g., 1 and 7, 3 and 5, 4 and 4, 6 and 2, etc.). In some embodiments, the sizes of the logical ways may be configured by the control logic 170 (shown in FIG. 1) based on the sizes of the data elements to be stored in the logical ways.

In one more embodiments, the number of logical ways included in each physical way 210 may correspond to the maximum compression ratio of the stored data. For instance, in the example shown in FIG. 2A, assume that the maximum compression ratio of the stored data is two-to-one. Accordingly, the physical way 210 may include two logical ways (i.e., the baseline way 220 and the victim way 230).

In some embodiments, the control logic 140 (shown in FIG. 1A) may include functionality to provide logical caches using these logical ways. For example, referring to FIGS. 1B and 2A, the baseline cache 180 may include all of the baseline ways 220 stored in the data array 150. Further, the victim cache 190 may include all of the victim ways 230 stored in the data array 150.

Figure 2B:
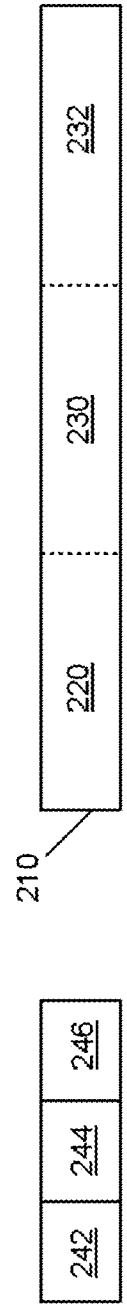

Referring now to FIG. 2B, shown is a second example in which the maximum compression ratio is three-to-one. Accordingly, the physical way 210 includes three logical ways, namely the baseline way 220, the victim way 230, and a secondary victim way 232. Further, these logical ways may be respectively associated with the first tag 242, the second tag 244, and a third tag 246. In some embodiments, all of the secondary victim ways 232 stored in the data array 150 may be used to form a secondary victim cache (not shown).

Figure 2C:
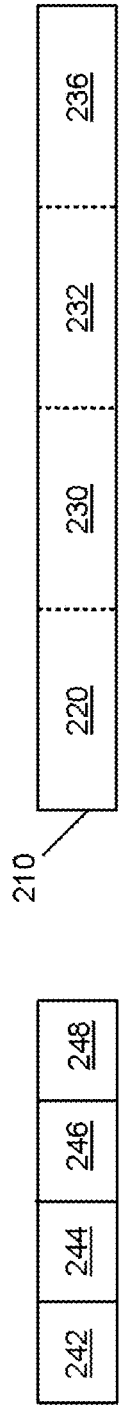

Referring to FIG. 2C, shown is a third example in which the maximum compression ratio is four-to-one. Accordingly, the physical way 210 includes four logical ways, namely the baseline way 220, the victim way 230, the secondary victim way 232, and a tertiary victim way 236. Further, these logical ways may be respectively associated with the first tag 242, the second tag 244, the third tag 246, and a fourth tag 248. In some embodiments, all of the tertiary victim ways 236 stored in the data array 150 may be used to form a tertiary victim cache (not shown).

Figure 2D:
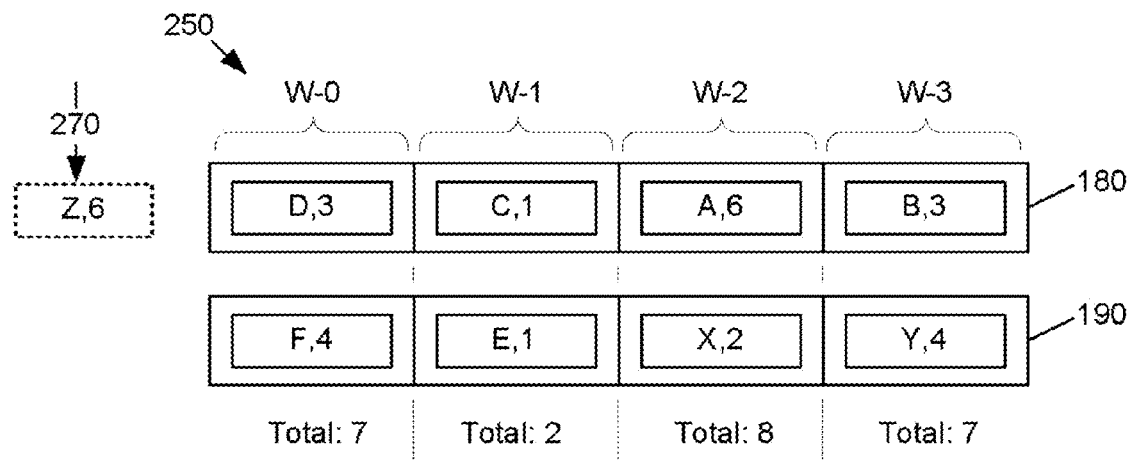
Figure 2E:
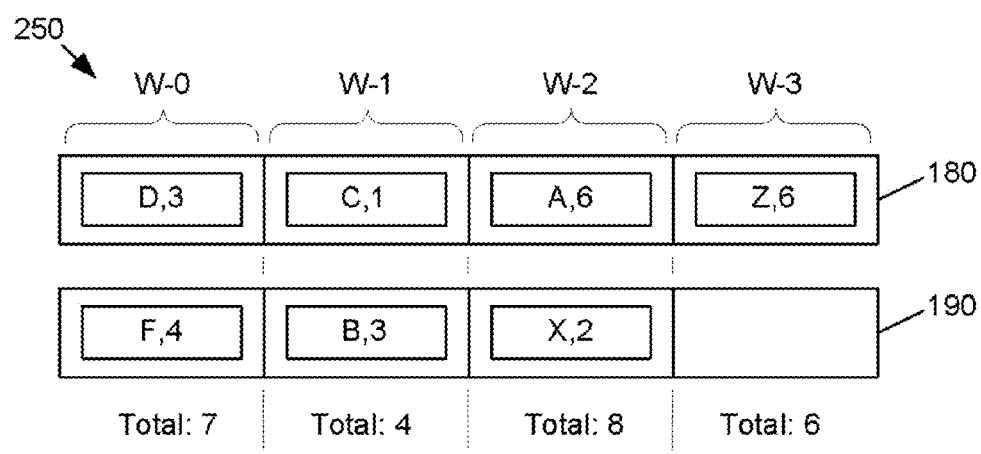

Referring now to FIGS. 2D-2E, shown is an example of a first cache operation in accordance with one or more embodiments. Specifically, FIG. 2D shows a starting state of the first cache operation, and FIG. 2E shows an ending state of the first cache operation.

Referring to FIG. 2D, shown is a cache unit 250 at the start of the first cache operation. In particular, the cache unit 250 may correspond generally to the data array 150 shown in FIGS. 1A-1B. As shown, the cache unit 250 may include four physical ways, respectively labeled "W-0," "W-1," "W-2," and "W-3." Each of these physical ways may correspond generally to the physical way 210 shown in FIGS. 2A-2C.

Assume that the cache unit 250 stores data using a maximum compression ratio of two-to-one. Accordingly, the cache unit 250 includes two logical cache levels, namely the baseline cache 180 and the victim cache 190. As shown, the baseline cache 180 includes four baseline ways, and the victim cache 190 includes four victim ways. Note that, in this example, each baseline way and victim way includes a data element, thereby indicating that the baseline cache 180 and the victim cache 190 are both full. Note also that each data element is represented by a letter and a number (e.g., "D,3"). Assume that, in each data element, the letter is an identifier for the data element, and the number indicates the compressed size of the data element (e.g., number of segments) when stored in the baseline cache 180 or the victim cache 190.

In the example of FIG. 2D, a baseline way and a victim way in vertical alignment may be stored together in a single physical way (e.g., as shown in FIG. 2A). For instance, in a given physical way (e.g., "W-0"), the baseline way may correspond to the baseline way 220 shown in FIG. 2A, the victim way may correspond to the victim way 230 shown in FIG. 2A, and both may be stored together in the physical way 210 shown in FIG. 2A. Note that, as used herein, the physical way identifier "W-x" may also be applied to a baseline way or victim way included in that physical way. For example, the term "baseline way W-1" may refer to the baseline way included in physical way W-1.

For the sake of illustration, FIG. 2D shows the total used capacity for each physical way (i.e., the total size of the data elements stored in the physical way). For example, in physical way W-0, the total used capacity (seven) is the sum of the sizes of element D,3 and element F,4. In another example, in the physical way W-1, the total used capacity (two) is the sum of the sizes of element C,1 and element E,1.

Assume that the cache unit 250 receives a request 270 for data element Z,6. In response to the request 270, a search for the element Z,6 is performed in the baseline cache 180. However, in this example, the element Z,6 is not included in the baseline cache 180, thereby resulting in a first cache miss. In response to the first cache miss, a search for the element Z,6 is performed in the victim cache 190. As shown, the element Z,6 is not included in the victim cache 190, thereby resulting in a second cache miss. Assume that, in response to the second cache miss, the element Z,6 is obtained from an external memory (e.g., memory 120 shown in FIG. 1A), and is provided to satisfy the request 270 (e.g., to a requesting execution unit).

In some embodiments, the baseline cache 180 may be configured to store the most recently used data elements in compressed form. Thus, because the element Z,6 is the most recently used element in this example, a cache operation is performed to store the element Z,6 in the baseline cache 180. This cache operation may include compressing the element Z,6 (e.g., using compression logic 145 shown in FIG. 1A), and selecting a way of the baseline cache 180 to store the element Z,6. Assume that, in the example of FIG. 2D, the control logic 140 (shown in FIG. 1A) uses a LRU replacement policy for the baseline cache 180. Assume further that element B,3 (stored in baseline way W-3) is the least recently used element of the baseline cache 180. Accordingly, the element B,3 is evicted from the baseline cache 180, and the baseline way W-3 is thereby made available to store element Z,6. Next, as shown in FIG. 2E, the element Z,6 is stored in the baseline way W-3.

In one or more embodiments, the victim cache 190 may be configured to store data elements evicted from the baseline cache 180. Thus, the element B,3 (evicted from baseline way W-3) may be stored in the victim cache 190. In particular, the control logic 140 may select a victim way to receive the evicted element B,3 based on the available capacity of the physical way. For example, assume that the control logic 140 initially identifies the victim way W-2 based on a selection policy (e.g., random selection, least-recently used, turn-based, etc.). However, the control logic 140 may determine that, if element B,3 is stored in victim way W-2, the total used capacity of physical way W-2 would equal nine (i.e., the sum of A,6 and B,3), and would thus exceed the maximum available capacity (i.e., eight). Therefore, assume that the control logic 140 identifies another victim way using the selection policy, namely victim way W-1. In this situation, the total used capacity of physical way W-1 would equal four (i.e., the sum of C,1 and B,3), and would thus would not exceed the maximum available capacity. Accordingly, as shown in FIG. 2E, the control logic 140 may evict element E,1 from victim way W-1, and may store element B,3 (evicted from baseline way W-3) in victim way W-1.

In some embodiments, the control logic 140 may determine that, if element Z,6 is stored in baseline way W-3, the total used capacity of physical way W-3 would equal ten (i.e., the sum of Z,6 and Y,4), and would thus exceed the maximum available capacity (i.e., eight). Therefore, as shown in FIG. 2E, the control logic 140 may evict element Y,4 from victim way W-3. Accordingly, the total used capacity of physical way W-3 (i.e., six) does not exceed the maximum available capacity.

Figure 2F:
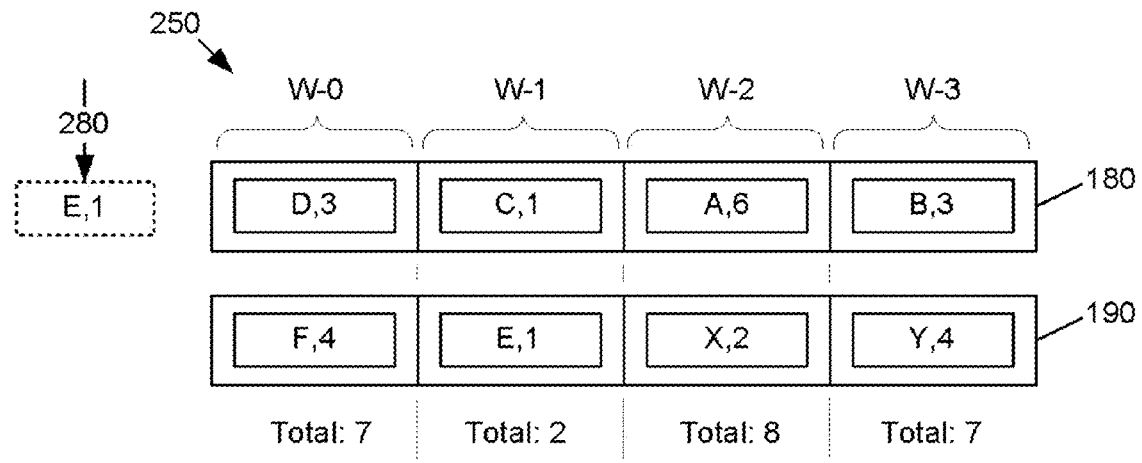
Figure 2G:
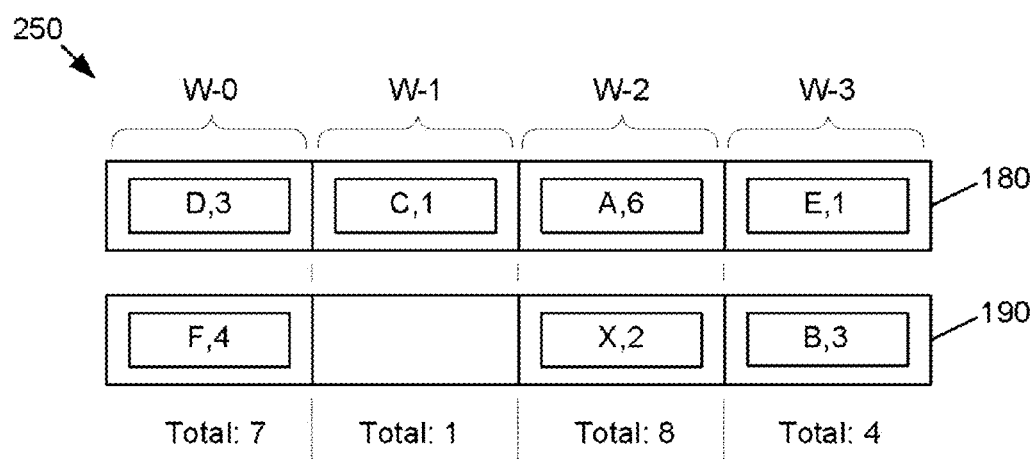

Referring now to FIGS. 2F-2G, shown is an example of a second cache operation in accordance with one or more embodiments. Specifically, FIG. 2F shows a starting state of the second cache operation, and FIG. 2G shows an ending state of the second cache operation Note that the starting state of the cache unit 250 shown in FIG. 2F corresponds to the starting state of the cache unit 250 shown in FIG. 2D.

Assume that, in the example of FIG. 2F, the cache unit 250 receives a request 280 for data element E,1. In response to the request 280, a search for the element E,1 is performed in the baseline cache 180. However, in this example, the element E,1 is not included in the baseline cache 180, thereby resulting in a cache miss. In response to the first cache miss, a search for the element E,1 is performed in the victim cache 190. As shown, the element E,1 is stored in victim way W-1. Therefore, the element E,1 is obtained from victim way W-1, and is provided to satisfy the request 280. In some embodiments, the element E,1 may be decompressed (e.g., using compression logic 145 shown in FIG. 1A) before being provided to satisfy the request 280. Note that, by using the victim cache 190, the cache miss in the baseline cache 180 is handled without requiring a read of an external memory (e.g., memory 120 shown in FIG. 1A). Accordingly, in some embodiments, cache performance may be improved over conventional caches.

As noted above, the baseline cache 180 is configured to store the most recently used data elements. Thus, a baseline way of the baseline cache 180 is selected to store the data element E,1. Assume that, as in the example of FIGS. 2D-2E, the element B,3 (stored in baseline way W-3) is the least recently used element of the baseline cache 180. Accordingly, the element B,3 is evicted from the baseline cache 180, and the baseline way W-3 is thereby made available to store the element E,1. Further, as shown in FIG. 2G, the element E,1 is moved from victim way W-1 to the baseline way W-3.

As discussed above, in some embodiments, the control logic 140 selects a victim way to receive the evicted element B,3 based on the available capacity of the physical way. Assume that, in this example, the control logic 140 randomly selects the victim way W-3 to receive the evicted data. Further, the control logic 140 determines that, if element B,3 is stored in victim way W-3, the total used capacity of physical way W-3 would equal four (i.e., the sum of E,1 and B,3), and thus would be within the maximum available capacity (i.e., eight). Therefore, as shown in FIG. 2G, the control logic 140 may evict element Y,4 from victim way W-3, and may store element B,3 (evicted from baseline way W-3) in victim way W-3.

Figure 3A:
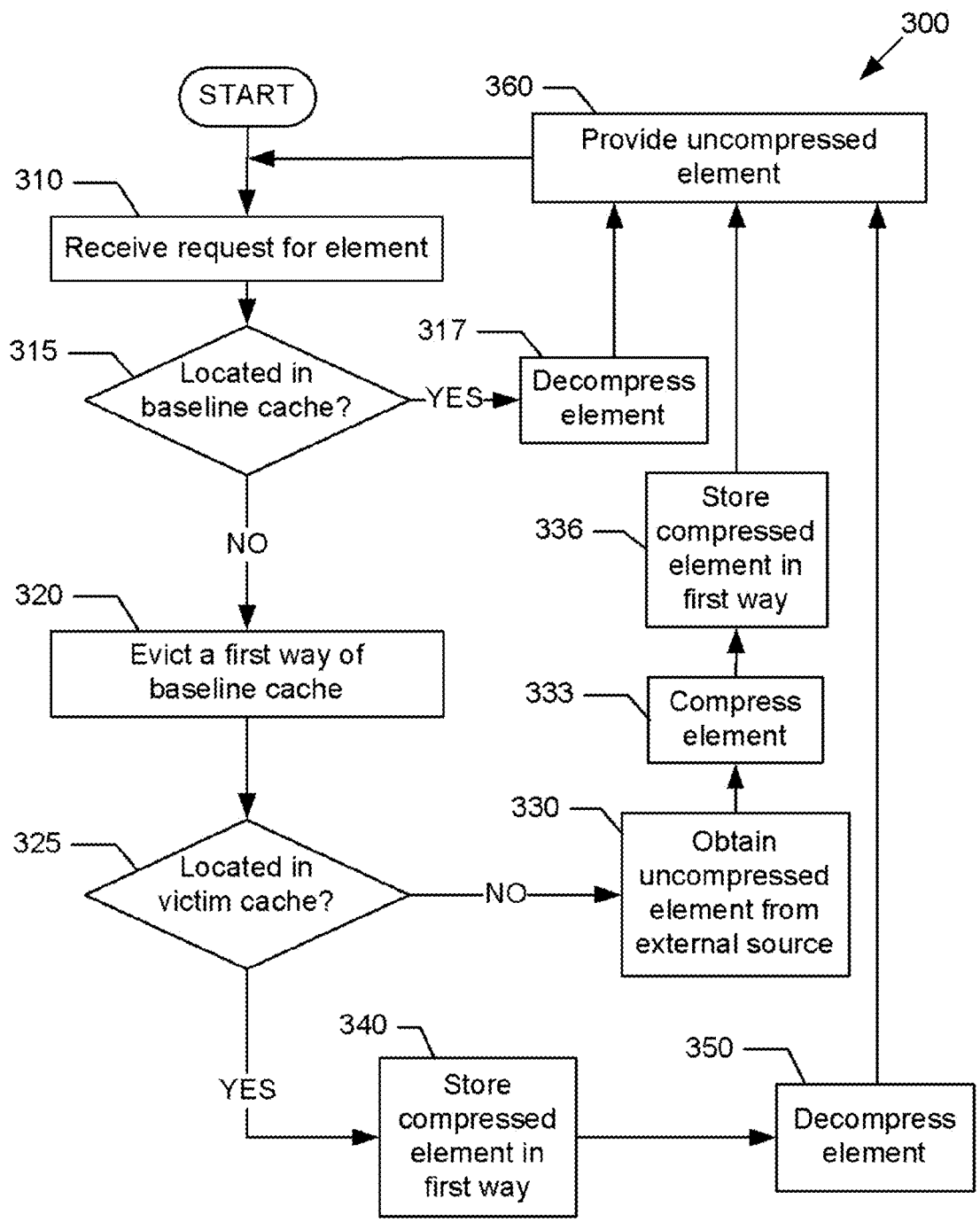
FIGS. 3A-3B are sequences in accordance with one or more embodiments.

Referring now to FIG. 3A, shown is a sequence 300 in accordance with one or more embodiments. In one or more embodiments, the sequence 300 may be part of the control logic 140 shown in FIG. 1A. The sequence 300 may be implemented in hardware, software, and/or firmware. In firmware and software embodiments it may be implemented by computer executed instructions stored in a non-transitory computer readable medium, such as an optical, semiconductor, or magnetic storage device. For the sake of illustration, the steps involved in the sequence 300 may be described below with reference to FIGS. 1A-1B and 2A-2G, which show examples in accordance with some embodiments. However, the scope of the various embodiments discussed herein is not limited in this regard.

At step 310, a request for a data element may be received. For example, referring to FIGS. 1A and 2D, the control logic 140 may receive a request 270 for data element Z,6.

At step 315, a determination about whether the requested data element is included in a logical baseline cache. For example, referring to FIGS. 1A and 2D, the control logic 140 may determine whether a requested data element is located in the baseline cache 180. In one or more embodiments, this determination may involve searching tags included in the tag array 160. Further, in some embodiments, the baseline cache may store data in compressed form.

If it is determined at step 315 that the requested data element is included in the baseline cache, then at step 317, the data element may be decompressed. For example, referring to FIGS. 1A and 2D, the compression logic 145 may decompress a data element stored in the baseline cache 180.

At step 360, the uncompressed data element may be provided to the requesting entity. For example, referring to FIGS. 1A and 2D, the control logic 140 may provide the uncompressed data element to an execution unit. After step 360, the sequence 300 returns to step 310 to process any subsequent requests for data elements.

However, if it is determined at step 315 that the requested data element is not included in the baseline cache, then at step 320, a first way of the baseline cache may be evicted. For example, referring to FIGS. 1A and 2D, the control logic 140 may evict element B,3 from baseline way W-3. An example expansion of step 320 is discussed below with reference to FIG. 3B.

At step 325, a determination about whether the requested data element is included in a logical victim cache. For example, referring to FIGS. 1A and 2D, the control logic 140 may determine whether the requested data element is located in the victim cache 190. In some embodiments, this determination may involve searching the tag array 160.

If it is determined at step 325 that the data element is not included in the victim cache, then at step 330, the uncompressed data element may be obtained from an external source (e.g., hard drive, memory, another cache, etc.). For example, referring to FIGS. 1A and 2D, the control logic 140 may obtain an uncompressed data element from the memory 120.

At step 333, the uncompressed data element may be compressed. For example, referring to FIGS. 1A and 2D, the compression logic 145 may compress the uncompressed data element.

At step 336, the compressed data element may be stored in the first way of the baseline cache (i.e., the baseline way evicted in step 320). For example, referring to FIGS. 1A and 2E, the control logic 140 may store the compressed data element Z,6 in the baseline way W-3. At step 360, the uncompressed data element may be provided to the requesting entity. After step 360, the sequence 300 returns to step 310 to process any subsequent requests for data elements.

However, if it is determined at step 325 that the data element is included in the victim cache, then at step 340, the compressed data element may be stored in the first way of the baseline cache (i.e., the baseline way evicted in step 320). For example, referring to FIGS. 1A, 2F, and 2G, the control logic 140 may move the compressed data element E,1 from the victim way W-1 to the baseline way W-3. In some embodiments, the victim cache may store data in compressed form.

At step 350, the compressed data element may be decompressed. For example, referring to FIGS. 1A and 2F, the compression logic 145 may decompress the compressed data element E,1. At step 360, the uncompressed data element may be provided to the requesting entity. After step 360, the sequence 300 returns to step 310 to process any subsequent requests for data elements.

Figure 3B:
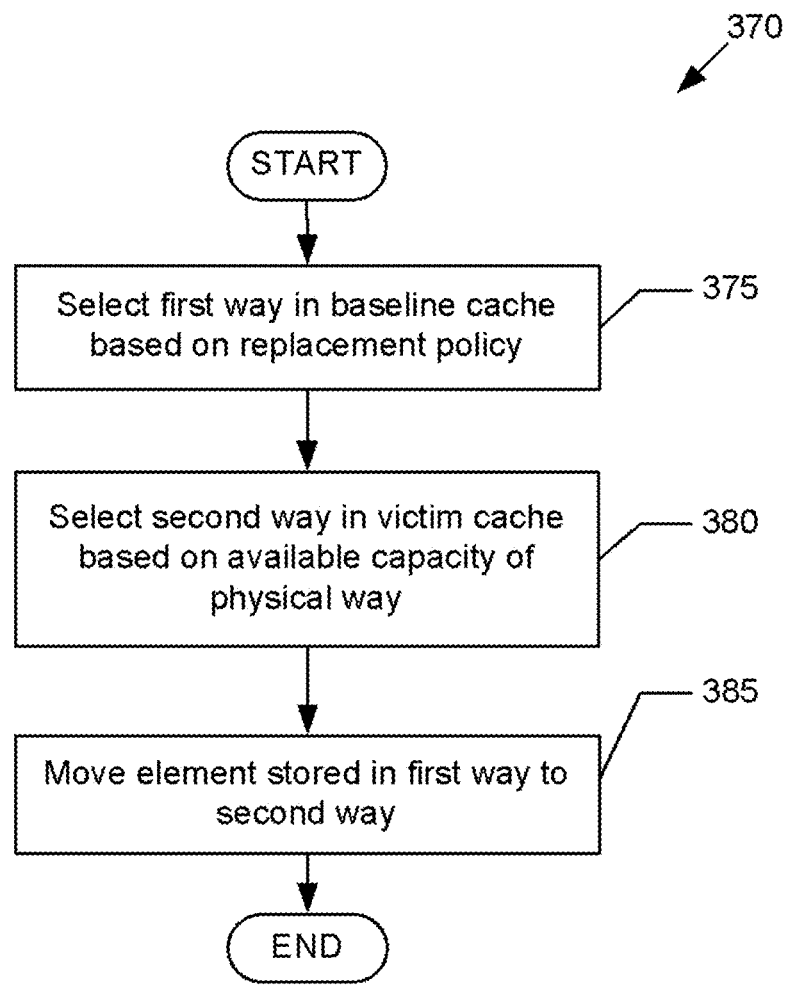

Referring now to FIG. 3B, shown is a sequence 370 for evicting a baseline way, in accordance with one or more embodiments. In one or more embodiments, the sequence 370 may be part of the control logic 140 shown in FIG. 1A. The sequence 370 may be implemented in hardware, software, and/or firmware. In firmware and software embodiments it may be implemented by computer executed instructions stored in a non-transitory computer readable medium, such as an optical, semiconductor, or magnetic storage device.

In one or more embodiments, the sequence 370 may be an exemplary expansion of step 320 shown in FIG. 3A. Thus, in some embodiments, the sequence 370 may be performed in the event that a requested data element is not located in a baseline cache (i.e., a negative determination in step 315 shown in FIG. 3A). For the sake of illustration, the steps involved in the sequence 370 may be described below with reference to FIGS. 1A-1B and 2A-2G, which show examples in accordance with some embodiments. However, the scope of the various embodiments discussed herein is not limited in this regard.

At step 375, a first way of a baseline cache may be selected based on a replacement policy. For example, referring to FIGS. 1A and 2D, the control logic 140 may determine that element B,3 stored in baseline way W-3 is the least recently used element of the baseline cache 180, and may thus select baseline way W-3 for eviction.

At step 380, a second way of a victim cache may be selected based at least in part on the available capacity of the physical way. For example, referring to FIGS. 1A and 2D, the control logic 140 may initially identify the victim way W-1 based on one or more selection policies (e.g., random selection, least-recently used, turn-based, etc.). Further, the control logic 140 may determine the size of the compressed data element (i.e., element C,1) stored in baseline way W-1 (i.e., the baseline way included in the same physical way as the victim way W-1). The control logic 140 may subtract the size of data element C,1 (i.e., one) from the maximum capacity size of physical way W-1 (i.e., eight) to determine the available capacity of physical way W-1 (i.e., seven). Thus, because the size of evicted element B,3 (i.e., three) would not exceed the available capacity of physical way W-1, the control logic 140 may select victim way W-1 to receive the evicted element B,3. However, if the size of an evicted element would exceed the available capacity of the physical way, the control logic 140 may select a different victim way (e.g., using a selection policy), and may again determine whether the available capacity is exceeded.

At step 385, the data element stored in the first way of the baseline cache (selected at step 375) may be moved to the second way of the victim cache (selected at step 380). For example, referring to FIGS. 1A and 2D-2E, the control logic 140 may move the evicted data element B,3 from the baseline way W-3 to the victim way W-1. After step 385, the sequence 370 ends.

Note that the examples shown in FIGS. 1A-1B, 2A-2G, and 3A-3B are provided for the sake of illustration, and are not intended to limit any embodiments. For example, while the processor 110 is shown in FIG. 1A as including one set of cache components 130, it is contemplated that some embodiments may include multiple sets of cache components 130 (e.g., in one or more of a first level cache, a mid-level cache (MLC), a last level cache (LLC), etc.). In another example, while the cache components 130 are shown in FIG. 1A as located in the processor 110, it is contemplated that in some embodiments, one or more of the cache components 130 may be external to the processor 110. Further, while embodiments may be shown in simplified form for the sake of clarity, embodiments may include any number and/or arrangement of processors, cores, and/or additional components (e.g., buses, storage media, connectors, power components, buffers, interfaces, sub-components, etc.). It is contemplated that specifics in the examples shown in FIGS. 1A-1B, 2A-2G, and 3A-3B may be used anywhere in one or more embodiments.

Figure 4:
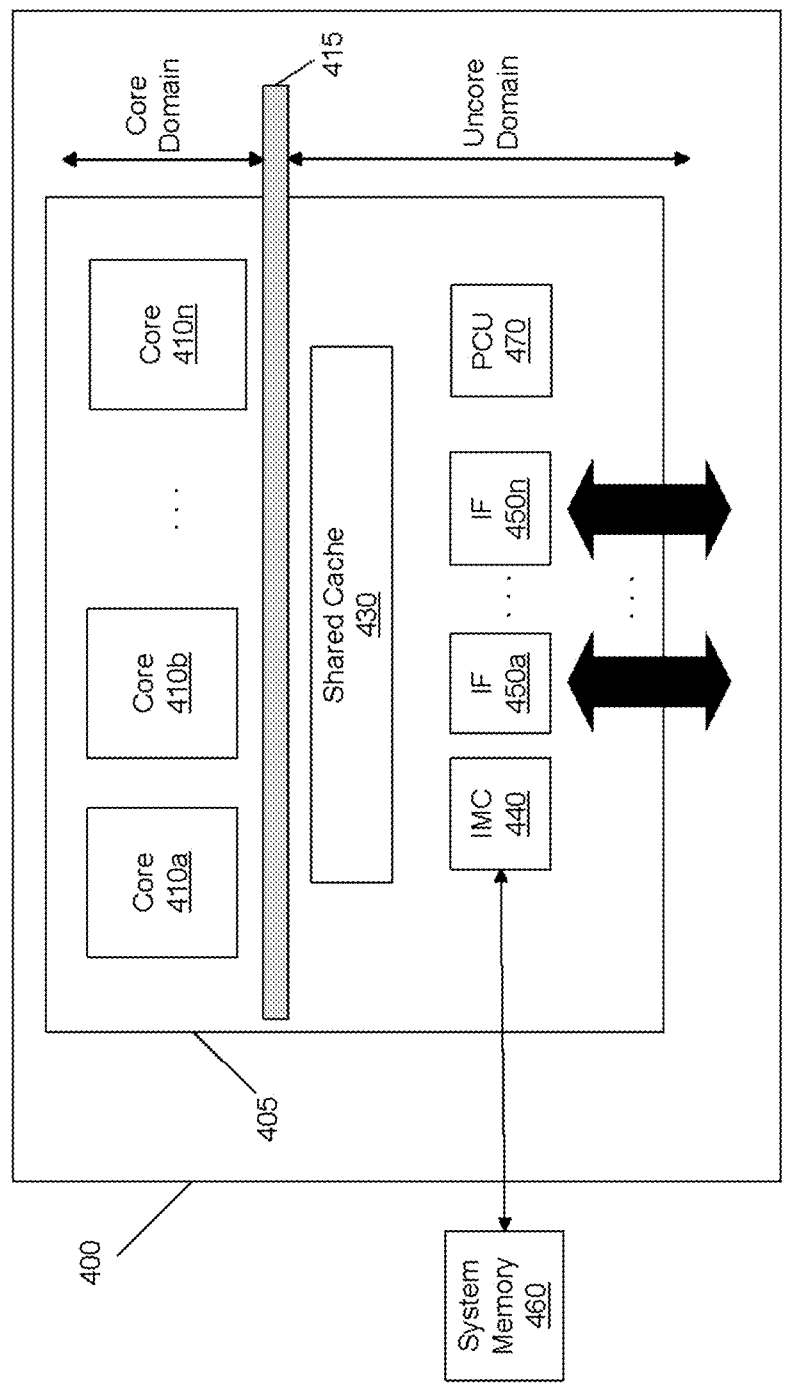
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain that includes various components. As seen, the uncore domain may include a shared cache 430. In addition, the uncore may include an integrated memory controller 440, a power control unit (PCU) 470, and various interfaces 450.

Although not shown for ease of illustration in FIG. 4, in some embodiments, the processor 400 may include some or all of the functionality of one or more of the cache components 130 described above with reference to FIGS. 1A-1B, 2A-2G, and 3A-3B. For example, a core 410 and/or the shared cache 430 may include some or all of the functionality of the data array 150, the tag array 160, the control logic 140, and/or the compression logic 145 described above.

With further reference to FIG. 4, the processor 400 may communicate with a system memory 460, e.g., via a memory bus. In addition, by interfaces 450, connection can be made to another processor, or various off-package components such as peripheral devices, mass storage and so forth. While shown with this particular implementation in the embodiment of FIG. 4, the scope of the present invention is not limited in this regard.

Figure 5:
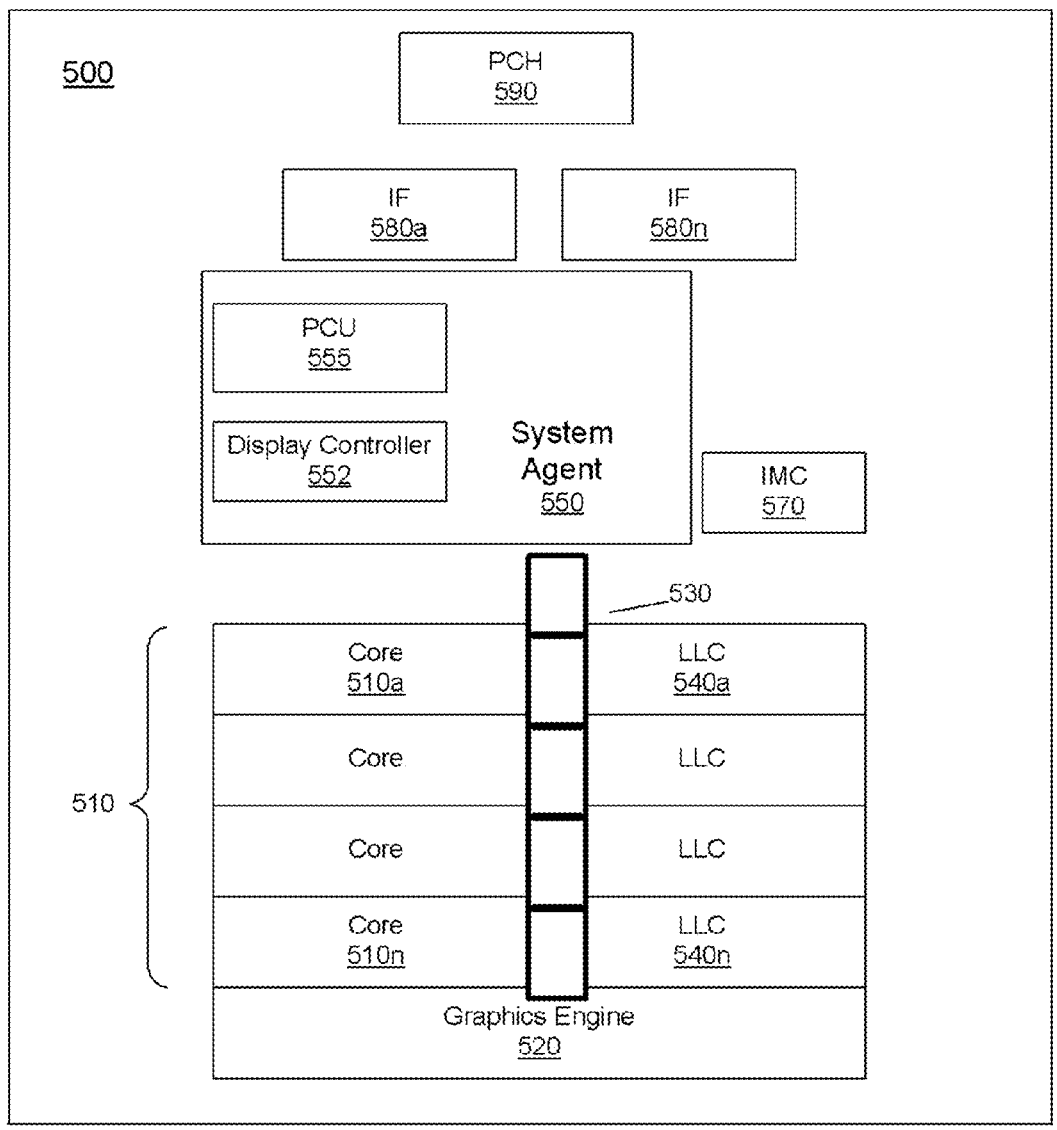
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry.

As seen, a ring interconnect 530 thus couples the cores together, and provides interconnection between the cores, graphics domain 520 and system agent circuitry 550. In some embodiments, the ring interconnect 530 may be a multiplexor or crossbar device. In the embodiment of FIG. 5, system agent domain 550 may include display controller 552 which may provide control of and an interface to an associated display. As further seen, system agent domain 550 may also include a power control unit 555 to allocate power to the CPU and non-CPU domains.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor 500, and can be implemented on a separate die, in some embodiments. Alternatively, in some embodiments, the PCH 590 may be external to the processor 500. Although shown at this high level in the embodiment of FIG. 5, understand the scope of the present invention is not limited in this regard.

Although not shown for ease of illustration in FIG. 5, in some embodiments, the processor 500 may include some or all of the functionality of one or more of the cache components 130 described above with reference to FIGS. 1A-1B, 2A-2G, and 3A-3B. For example, a core 510 and/or the LLC 540 may include some or all of the functionality of the data array 150, the tag array 160, the control logic 140, and/or the compression logic 145 described above.

Figure 6:
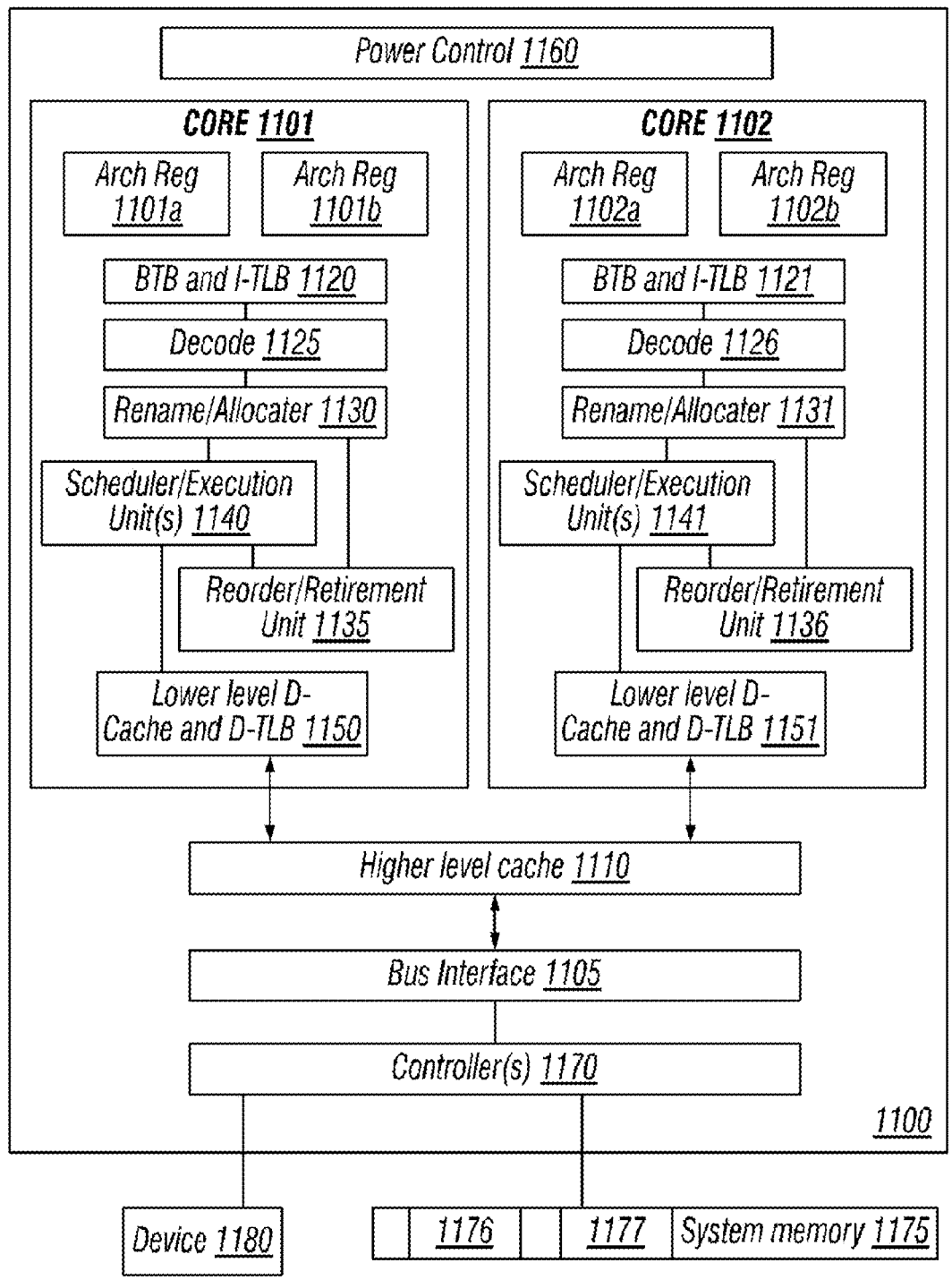
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above.

As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB 1150 is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces. In the depicted configuration, processor 1100 also includes bus interface module 1105 and a power controller 1160, which may perform power management in accordance with an embodiment of the present invention.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Although not shown for ease of illustration in FIG. 6, in some embodiments, the processor 1100 may include some or all of the functionality of one or more of the cache components 130 described above with reference to FIGS. 1A-1B, 2A-2G, and 3A-3B. For example, core 1101, core 1102, lower-level data cache and data translation buffer 1150, and/or higher level cache 1110 may include some or all of the functionality of the data array 150, the tag array 160, the control logic 140, and/or the compression logic 145 described above.

Figure 7:
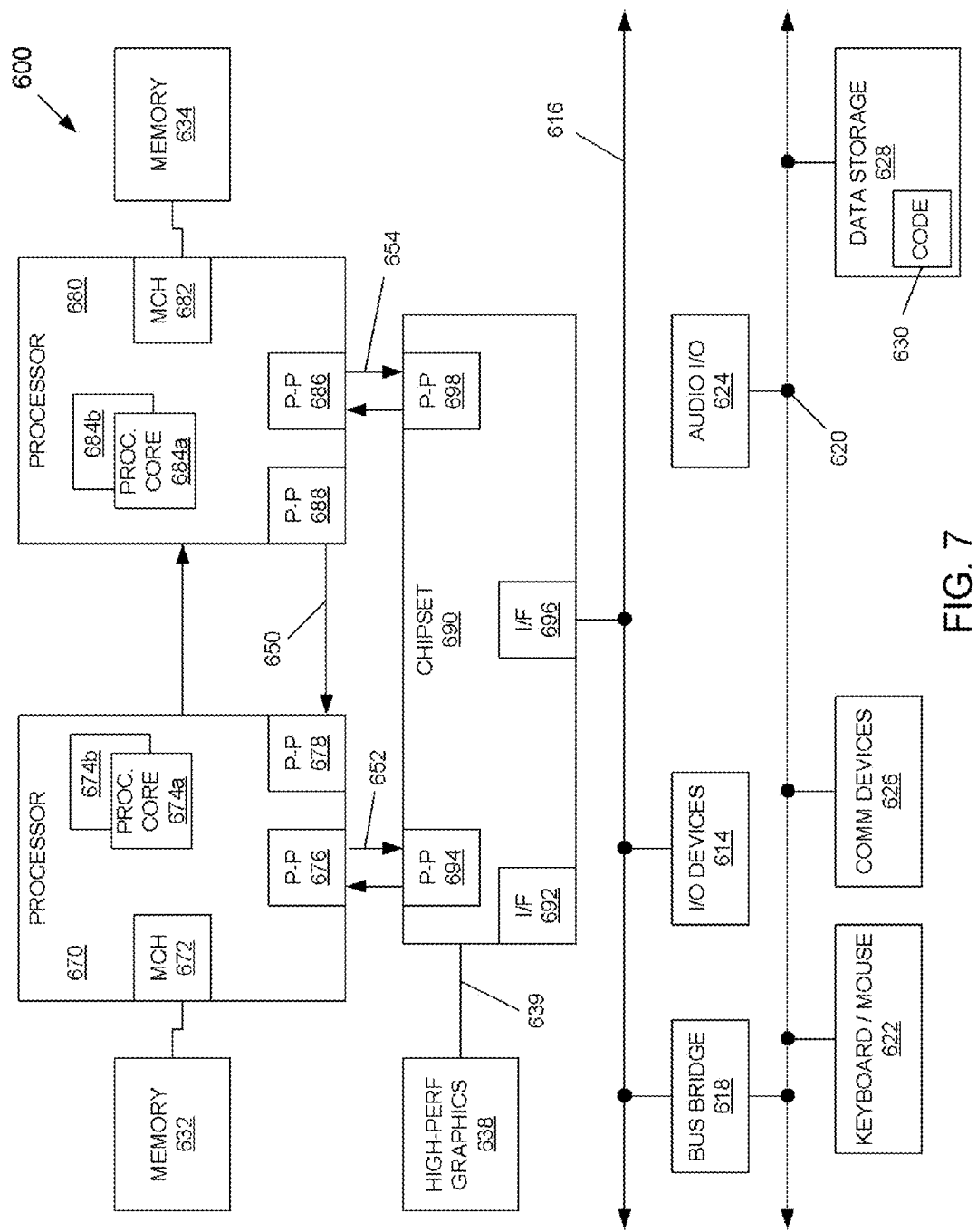
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Although not shown for ease of illustration in FIG. 7, in some embodiments, any portion of the multiprocessor system 600 may include some or all of the functionality of one or more of the cache components 130 described above with reference to FIGS. 1A-1B, 2A-2G, and 3A-3B. For example, processor 670 and/or processor 680 may include some or all of the functionality of the data array 150, the tag array 160, the control logic 140, and/or the compression logic 145 described above.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 8:
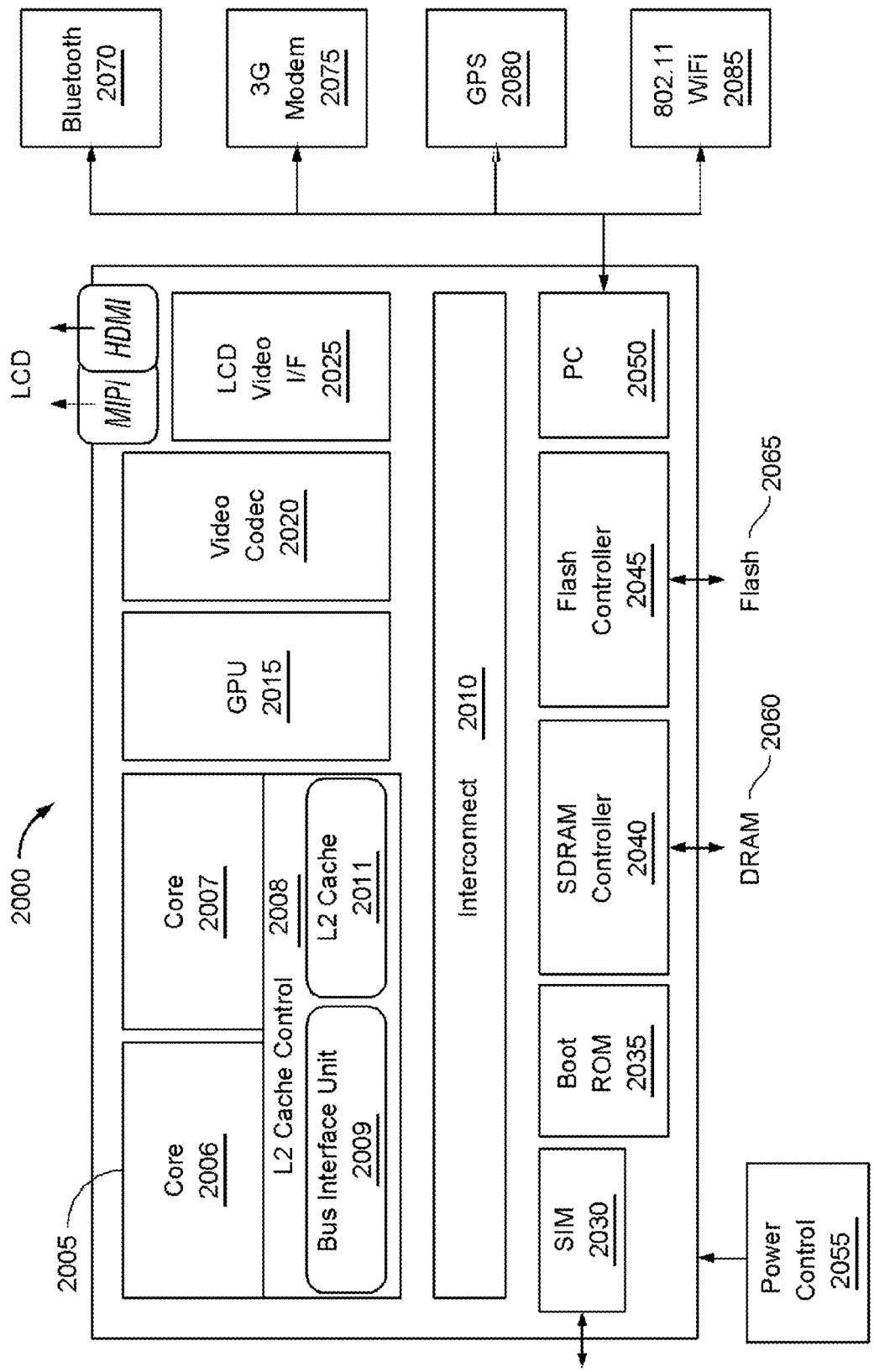
FIG. 8 is a block diagram of a system on a chip in accordance with an embodiment of the present invention.

Turning next to FIG. 8, an example of a system on-chip (SOC) design in accordance with some embodiments is depicted. As a specific illustrative example, SOC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 2000 includes 2 cores—2006 and 2007. The cores 2006 and 2007 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2011 to communicate with other parts of system 2000. Interconnect 2010 includes an on-chip interconnect, such as an IOSF, AMBA, or any other interconnect, which potentially implements one or more aspects of the described invention.

Interface 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral control Q1650 (e.g. Serial Peripheral Interface) to interface with peripherals, video codecs 2020 and Video interface 2025 to display and receive input (e.g. touch enabled input), GPU 2015 to perform graphics related computations, etc.

In addition, the system illustrates peripherals for communication, such as a Bluetooth module 2070, 3G modem 2075, GPS 2085, and WiFi 2085. Note that a UE includes a radio for communication. As a result, these peripheral communication modules are not all required. However, in a UE some form a radio for external communication is to be included.

Although not shown for ease of illustration in FIG. 8, in some embodiments, the SOC 2000 may include some or all of the functionality of one or more of the cache components 130 described above with reference to FIGS. 1A-1B, 2A-2G, and 3A-3B. For example, core 2006, core 2007, L2 cache 2011, and/or cache control 2008 may include some or all of the functionality of the data array 150, the tag array 160, the control logic 140, and/or the compression logic 145 described above.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. In one example embodiment may be a processor for executing instructions, the processor including a cache data array including a plurality of physical ways, each physical way to store a baseline way and a victim way; a cache tag array including a plurality of tag groups, each tag group associated with a particular physical way and including a first tag and a second tag, the first tag associated with the baseline way stored in the particular physical way, and the second tag associated with the victim way stored in the particular physical way; and cache control logic to: select a first baseline way based on a replacement policy, select a first victim way based on an available capacity of a first physical way including the first victim way, and move a first data element from the first baseline way to the first victim way.

In an example, the first baseline way is one of a plurality of baseline ways of a baseline cache, and wherein the first victim way is one of a plurality of victim ways of a victim cache.

In an example, the cache control logic may be further to determine whether a requested data element is stored in the baseline cache; and in response to a determination that the requested data element is stored the baseline cache, provide the requested data element to a requesting entity.

In an example, the cache control logic may be further to determine whether the requested data element is stored in the victim cache; in response to a determination that the requested data element is stored in the victim cache: provide the requested data element to the requesting entity, and move the requested data element from the victim cache to the baseline cache.

In an example, the processor may also include cache compression logic to, prior to the requested data element being provided to the requesting entity, decompress the requested data element.

In an example, the cache compression logic may be further to compress at least some data stored in the baseline cache and the victim cache.

In an example, the cache control logic may be to determine whether the requested data element is stored in the victim cache in response to a determination that the requested data element is not stored in the baseline cache.

In an example, the cache control logic may be further to, in response to a determination that the requested data element is not stored in the baseline cache or the victim cache: obtain the requested data element from an external source, provide the requested data element to a requesting entity, and store the requested data element in the first baseline way.

In an example, the cache compression logic may be further to, prior to the requested data element being stored in the first baseline way, compress the requested data element.

In an example, the replacement policy may be one selected from a group consisting of a least recently used (LRU) policy, a random replacement policy, a least frequently used policy, and a most recently used policy.

In an example, the cache control logic may be further to: determine a size of a second data element stored in a second baseline way, the second baseline way included in the first physical way; and determine the available capacity of the first physical way by subtracting the size of the second data element from a maximum capacity size of the first physical way.

In another example embodiment may be a system including a processor and a dynamic random access memory (DRAM) coupled to the processor. The processor may include at least one core to execute instructions; a plurality of physical ways, each physical way including a first portion and a second portion, the first portion to store one of a plurality of baseline ways, the second portion to store one of a plurality of victim ways, the plurality of baseline ways forming a baseline cache, the plurality of victim ways forming a victim cache; and cache logic to: select a first victim way based on a size of an associated baseline way, and evict a first data element from a first baseline way to the first victim way.

In an example, the processor may also include a tag array including a first plurality of tags corresponding to the plurality of baseline ways, and a second plurality of tags corresponding to the plurality of victim ways.

In an example, the processor may also include compression logic to compress data stored in the baseline cache or the victim cache, and to decompress data read from the baseline cache or the victim cache.

In an example, the cache logic may be further to receive, from a requesting entity, a request for a second data element; upon locating the second data element in the victim cache:

provide the second data element to the requesting entity, and move the second data element from the victim cache to the baseline cache.

In an example, the first victim way and the associated baseline way may be stored together in a physical way.

In another example embodiment may be a method for cache management, the method including receiving, by a cache control logic, a request for a first data element; determining, by the cache control logic, whether the first data element is stored in one of a plurality of baseline ways, wherein each one of the plurality of baseline ways is stored, along with a corresponding one of a plurality of victim ways, in one of a plurality of physical ways of a cache memory; in response to a determination that the first data element is not stored in one of the plurality of baseline ways: evicting a first baseline way of the plurality of baseline ways; obtaining the first data element; and storing the first data element in the first baseline way.

In an example, obtaining the first data element may include: determining whether the first data element is stored in the plurality of victim ways; and in response to a determination that the first data element is stored in the plurality of victim ways, moving the first data element from the plurality of victim ways to the first baseline way.

In an example, obtaining the first data element may further include in response to a determination that the first data element is not stored in the plurality of victim ways, obtaining the first data element from an external memory.

In an example, the method may also include, in response to a determination that the first data element is stored in one of the plurality of baseline ways: decompressing the first data element; and providing the first data element to a requesting entity.

In an example, determining whether the first data element is stored in the plurality of baseline ways or in the plurality of victim ways may include using a tag array including a first plurality of tags corresponding to the plurality of baseline ways, and a second plurality of tags corresponding to the plurality of victim ways.

In an example, the method may also include compressing data stored in the plurality of baseline ways or in the plurality of victim ways.

In an example, evicting the first baseline way may include: selecting the first baseline way based on a replacement policy; selecting a first victim way based on an available capacity of a first physical way including the first victim way; and moving a second data element from the first baseline way to the first victim way.

In an example, the method may also include determining a size of a third data element stored in a second baseline way, the second baseline way included in the first physical way; and determining the available capacity of the first physical way by subtracting the size of the third data element from a maximum capacity size of the first physical way.

In another example embodiment may be a communication device arranged to perform the above method.

In another example embodiment may be at least one machine readable medium comprising a plurality of instructions that in response to being executed on a computing device, cause the computing device to carry out the above method.

In another example embodiment may be an apparatus for processing instructions, configured to perform the above method.

In another example embodiment may be an apparatus comprising means for performing the above method.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising:
  a cache data array including a plurality of physical ways, each physical way to store a baseline way and a victim way;
  a cache tag array including a plurality of tag groups, each tag group associated with a particular physical way and including a first tag and a second tag, the first tag associated with the baseline way stored in the particular physical way, and the second tag associated with the victim way stored in the particular physical way;
  cache control logic to:
    select a first baseline way based on a replacement policy;
    select a first victim way based on an available capacity of a first physical way including the first victim way; and
    move a first data element from the first baseline way to the first victim way.

2. The processor of claim 1, wherein the first baseline way is one of a plurality of baseline ways of a baseline cache, and wherein the first victim way is one of a plurality of victim ways of a victim cache.

3. The processor of claim 2, wherein the cache control logic is further to:
  determine whether a requested data element is stored in the baseline cache; and
  in response to a determination that the requested data element is stored the baseline cache, provide the requested data element to a requesting entity.

4. The processor of claim 3, wherein the cache control logic is further to:
  determine whether the requested data element is stored in the victim cache;
  in response to a determination that the requested data element is stored in the victim cache:
  provide the requested data element to the requesting entity, and
  move the requested data element from the victim cache to the baseline cache.

5. The processor of claim 4, further comprising cache compression logic to, prior to the requested data element being provided to the requesting entity, decompress the requested data element.

6. The processor of claim 5, wherein the cache compression logic is further to compress at least some data stored in the baseline cache and the victim cache.

7. The processor of claim 4, wherein the cache control logic is to determine whether the requested data element is stored in the victim cache in response to a determination that the requested data element is not stored in the baseline cache.

8. The processor of claim 4, wherein the cache control logic is further to, in response to a determination that the requested data element is not stored in the baseline cache or the victim cache:
obtain the requested data element from an external source;
provide the requested data element to a requesting entity; and
store the requested data element in the first baseline way.

9. The processor of claim 8, wherein the cache compression logic is further to, prior to the requested data element being stored in the first baseline way, compress the requested data element.

10. The processor of claim 1, wherein the replacement policy is one selected from a group consisting of a least recently used (LRU) policy, a random replacement policy, a least frequently used policy, and a most recently used policy.

11. The processor of claim 1, wherein the cache control logic is further to:
determine a size of a second data element stored in a second baseline way, the second baseline way included in the first physical way; and
determine the available capacity of the first physical way by subtracting the size of the second data element from a maximum capacity size of the first physical way.

12. A system comprising:
a processor comprising:
at least one core to execute instructions;
a plurality of physical ways, each physical way including a first portion and a second portion, the first portion to store one of a plurality of baseline ways, the second portion to store one of a plurality of victim ways, the plurality of baseline ways forming a baseline cache, the plurality of victim ways forming a victim cache;
cache logic to:
select a first victim way based on a size of an associated baseline way;
evict a first data element from a first baseline way to the first victim way; and
a dynamic random access memory (DRAM) coupled to the processor.

13. The system of claim 12, the processor further comprising:
a tag array including a first plurality of tags corresponding to the plurality of baseline ways, and a second plurality of tags corresponding to the plurality of victim ways.

14. The system of claim 12, the processor further comprising:
compression logic to compress data stored in the baseline cache or the victim cache, and to decompress data read from the baseline cache or the victim cache.

15. The system of claim 12, wherein the cache logic is further to:
receive, from a requesting entity, a request for a second data element;
upon locating the second data element in the victim cache:
provide the second data element to the requesting entity; and
move the second data element from the victim cache to the baseline cache.

16. The system of claim 12, wherein the first victim way and the associated baseline way are stored together in a physical way.

17. A method, comprising:
receiving, by a cache control logic, a request for a first data element;
determining, by the cache control logic, whether the first data element is stored in one of a plurality of baseline ways, wherein each one of the plurality of baseline ways is stored, along with a corresponding one of a plurality of victim ways, in one of a plurality of physical ways of a cache memory;
in response to a determination that the first data element is not stored in one of the plurality of baseline ways:
evicting a first baseline way of the plurality of baseline ways;
obtaining the first data element; and
storing the first data element in the first baseline way.

18. The method of claim 17, wherein obtaining the first data element comprises:
determining whether the first data element is stored in the plurality of victim ways; and
in response to a determination that the first data element is stored in the plurality of victim ways, moving the first data element from the plurality of victim ways to the first baseline way.

19. The method of claim 18, wherein obtaining the first data element further comprises:
in response to a determination that the first data element is not stored in the plurality of victim ways, obtaining the first data element from an external memory.

20. The method of claim 19, further comprising:
in response to a determination that the first data element is stored in one of the plurality of baseline ways:
decompressing the first data element; and
providing the first data element to a requesting entity.

* * * * *